(12) United States Patent
Bickhart et al.

(10) Patent No.: US 9,491,092 B1
(45) Date of Patent: Nov. 8, 2016

(54) APPARATUS, SYSTEM, AND METHOD FOR PREVENTING UNINTENTIONAL FORWARDING RECONFIGURATION IN NETWORK ENVIRONMENTS

(71) Applicant: Juniper Networks, Inc., Sunnyvale, CA (US)

(72) Inventors: Ryan Bickhart, San Francisco, CA (US); Disha Chopra, Union City, CA (US); Wen Lin, Andover, MA (US); Hassan Hosseini, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 254 days.

(21) Appl. No.: 14/503,061

(22) Filed: Sep. 30, 2014

(51) Int. Cl.
*H04L 12/28* (2006.01)
*H04L 12/707* (2013.01)
*H04L 12/721* (2013.01)

(52) U.S. Cl.
CPC .............. *H04L 45/22* (2013.01); *H04L 45/26* (2013.01)

(58) Field of Classification Search
None
See application file for complete search history.

(56) References Cited

U.S. PATENT DOCUMENTS

| | | | | |
|---|---|---|---|---|
| 7,668,082 B1* | 2/2010 | Callon | ............... | G06F 11/2294 370/218 |
| 2005/0195835 A1* | 9/2005 | Savage | ............... | H04L 12/2602 370/401 |
| 2008/0289911 A1* | 11/2008 | Yoshikawa | ........... | B66B 1/2458 187/382 |
| 2008/0310433 A1* | 12/2008 | Retana | .................... | H04L 45/02 370/401 |
| 2009/0161578 A1* | 6/2009 | Yeung | ..................... | H04L 45/02 370/254 |
| 2009/0283368 A1* | 11/2009 | Yoshikawa | ........... | B66B 1/2458 187/382 |
| 2011/0013508 A1* | 1/2011 | Tuplur | .................... | H04L 45/00 370/218 |
| 2012/0124238 A1* | 5/2012 | Nandagopal | .......... | H04L 45/023 709/242 |
| 2012/0287935 A1* | 11/2012 | Swallow | ................. | H04L 45/04 370/392 |
| 2013/0033978 A1* | 2/2013 | Eckert | ..................... | H04L 45/16 370/216 |
| 2013/0121340 A1* | 5/2013 | Papadimitriou | ........ | H04L 45/02 370/410 |
| 2013/0242996 A1* | 9/2013 | Varvello | ............... | H04L 67/327 370/392 |
| 2015/0319086 A1* | 11/2015 | Tripathi | ................ | H04W 12/06 370/254 |

OTHER PUBLICATIONS

Apoorva Jindal, et al.; Systems and Methods for Interfacing Software-Defined Networks With Non-Software-Defined Networks; U.S. Appl. No. 14/231,493, filed Mar. 31, 2014.
Raveendra Torv, et al; System and Method for Verifying the Functionality of Network Paths; U.S. Appl. No. 14/328,669, filed Jul. 10, 2014.

* cited by examiner

*Primary Examiner* — Phirin Sam
(74) *Attorney, Agent, or Firm* — ALG Intellectual Property, LLC

(57) ABSTRACT

The disclosed apparatus may include a physical link that facilitates communication for a plurality of customer networks connected to a service provider network. The apparatus may also include a network device communicatively coupled to the physical link. The network device may identify first and second route-update messages that advertise a plurality of route targets representing the plurality of customer networks to at least one other network device within the service provider network. The network device may remove a route target from the first route-update message due at least in part to the physical link no longer facilitating communication for a customer network represented by the route target. The network device may then maintain the second route-update message intact despite the removal of the route target from the first route-update message. Various other apparatuses, systems, and methods are also disclosed.

20 Claims, 11 Drawing Sheets

APPARATUS, SYSTEM, AND METHOD FOR PREVENTING UNINTENTIONAL FORWARDING RECONFIGURATION IN NETWORK ENVIRONMENTS

BACKGROUND

Service providers often forward data traffic to and from their customers in network environments. For example, an Internet Service Provider (ISP) may have a network that includes multiple Provider Edge (PE) routers. In this example, the PE routers may include physical links that facilitate communication for various Ethernet Virtual Private Networks (EVPNs) that correspond to the ISPs' customers. When a PE router associates a new EVPN with a physical link, this PE router may need to notify the other PE routers of the association in order to direct the EVPN's data traffic toward the physical link. Similarly, when a PE router disassociates an EVPN from a physical link, this PE router may need to notify the other PE routers of the disassociation in order to divert the EVPN's data traffic from the physical link.

These PE routers may notify one another of certain route changes by advertising such changes via update messages. For example, a PE router may generate a Border Gateway Protocol (BGP) message that identifies various EVPNs whose data traffic is currently routed through a physical link. The PE router may then disseminate this BGP message to the other PE routers via the ISP's network. These other PE routers may update their forwarding tables to direct the EVPNs' data traffic toward the associated physical link in response to the BGP message.

These update messages, however, may have certain limitations. For example, BGP messages may be limited to 4096 bytes (4K) of data. As a result, in the event that the amount of data needed to advertise the EVPNs exceeds the 4K data limit of a single BGP message, the PE router may attach those EVPNs' information (sometimes referred to as "route targets") to multiple BGP messages. In this example, one of these BGP messages may include the full 4K of data, and another one of these BGP messages may include the remaining data. The PE router may then disseminate these BGP messages to the other PE routers via the ISP's network. These other PE routers may update their forwarding tables to direct the EVPNs' data traffic toward the associated physical link in response to the BGP messages.

Once the PE router disassociates an EVPN from the physical link, the PE router may remove a route target representing that EVPN from the corresponding BGP message. For example, the PE router may remove a route target representing an EVPN from the BGP message that includes the full 4K of data, thereby potentially making room for another route target in the BGP message. In the event that only a single route target is attached to the other BGP message, the PE router may shift this single route target from the other BGP message to the previously full BGP message so as to eliminate the need to disseminate multiple BGP messages to update the other PE routers' forwarding tables. Unfortunately, since the other PE routers have already imported multiple BGP messages in connection with this physical link, the other PE routers may misinterpret the decreased number of BGP messages as an indication that the physical link is no longer operational. As a result, the other PE routers may reconfigure their forwarding tables by removing the routes advertised in connection with the physical link instead of simply disassociating the EVPN represented by the removed route target from the physical link.

As another example, in the event that other route targets are still attached to the other BGP message, the PE router may shift a route target from the other BGP message to the previously full BGP message. The PE router may then disseminate the full BGP message and this other BGP message to update the other PE routers' forwarding tables. Unfortunately, since the other PE routers have already imported previous corresponding BGP messages in connection with this physical link, the other PE routers may reevaluate their import states and/or potentially misinterpret the changed set of route targets attached to the other BGP message as an indication that the physical link is no longer operational. As a result, the other PE routers may reconfigure their forwarding tables by removing the routes advertised in connection with the physical link instead of simply disassociating the EVPN represented by the removed route target from the physical link.

The instant disclosure, therefore, identifies and addresses a need for improved apparatuses, systems, and methods for preventing unintentional forwarding reconfiguration in network environments.

SUMMARY

As will be described in greater detail below, the instant disclosure generally relates to apparatuses, systems, and methods for preventing unintentional forwarding reconfiguration in network environments. In one example, an apparatus for accomplishing such a task may include a physical link that facilitates communication for a plurality of customer networks connected to a service provider network. The apparatus may also include a network device communicatively coupled to the physical link. The network device may identify a plurality of route-update messages that advertise a plurality of route targets representing the plurality of customer networks to at least one other network device within the service provider network. The plurality of route-update messages may include a first route-update message whose configuration includes a threshold number of route targets from the plurality of route targets and a second route-update message whose configuration includes one or more other route targets from the plurality of route targets.

The network device may remove a route target from the configuration of the first route-update message due at least in part to the physical link no longer facilitating communication for a customer network represented by the route target. The network device may then maintain the configuration of the second route-update message despite the removal of the route target from the configuration of the first route-update message. In other words, the network device may refuse to move any of the route targets from the second route-update message to the first route-update message in response to the removal of the route target from the configuration of the first route-update message.

Similarly, a system incorporating the above-described apparatus may include a physical link that facilitates communication for a plurality of EVPNs connected to a service provider network. The system may also include a network device communicatively coupled to the physical link. The network device may identify a plurality of BGP messages that advertise the plurality of route targets to at least one other network device within the service provider network. The plurality of BGP messages may include a first BGP message whose configuration includes a threshold number of route targets from the plurality of route targets and a second BGP message whose configuration includes one or more other route targets from the plurality of route targets.

The network device may remove a route target from the configuration of the first BGP message due at least in part to the physical link no longer facilitating communication for a customer network represented by the route target. The network device may then maintain the configuration of the second BGP message despite the removal of the route target from the configuration of the first BGP message. In other words, the network device may refuse to move any of the route targets from the second BGP message to the first BGP message in response to the removal of the route target from the configuration of the first BGP message.

A corresponding method may include identifying a plurality of route targets that represent a plurality of customer networks whose communications are routed through a physical link within a service provider network. The method may also include identifying a plurality of route-update messages that advertise the plurality of route targets to at least one network device within the service provider network. The plurality of route-update messages may include a first route-update message whose configuration includes a threshold number of route targets from the plurality of route targets and a second route-update message whose configuration includes at least one route target from the plurality of route targets. The method may further include removing a route target from the configuration of the first route-update message due at least in part to the physical link no longer facilitating communications for a customer network represented by the route target. The method may additionally include maintaining, despite the removal of the route target from the configuration of the first route-update message, the configuration of the second route-update message without moving any of the route targets from the second route-update message to the first route-update message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
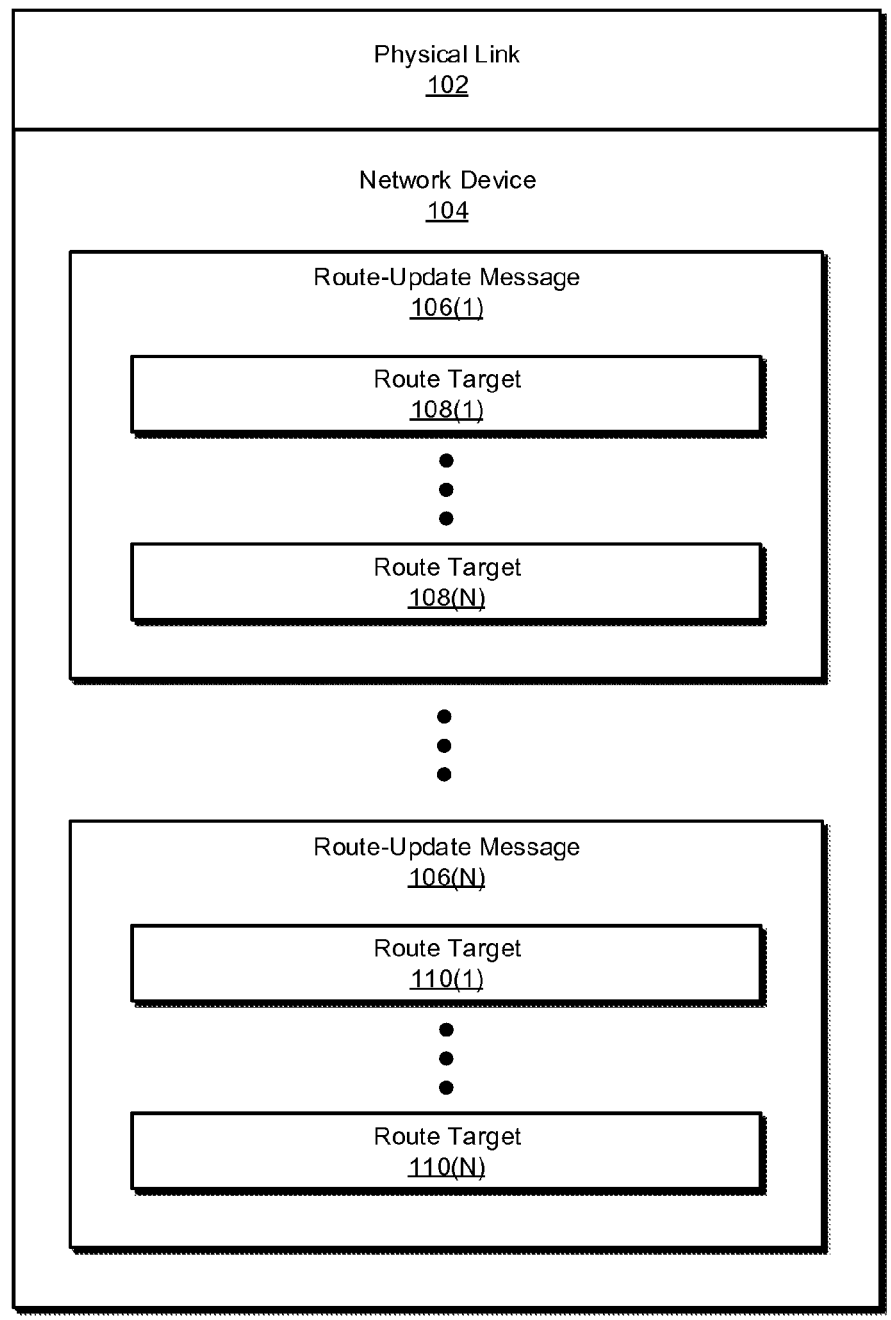
FIG. 1 is a block diagram of an exemplary apparatus for preventing unintentional forwarding reconfiguration in network environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for preventing unintentional forwarding reconfiguration in network environments. As will be explained in greater detail below, embodiments of the instant disclosure may identify multiple route targets corresponding to an ISP's customers whose data traffic is routed through a physical link of a network device within the ISP's network. In the event that the amount of data needed to advertise these route targets exceeds the data limit of a single route-update message, the network device may need to attach the identified route targets to multiple route-update messages in order to advertise these route targets throughout the ISP's network. By periodically advertising the route targets currently associated with the physical link in this way, the network device may be able to update the forwarding plane of the ISP's network to account for any route changes in connection with those customers.

In the event that the physical link of the network device no longer facilitates data traffic for one of the ISP's customers whose route target is attached to a full route-update message, the network device may remove that customer's route target from the route-update message, thereby potentially making room for another route target in the route-update message. However, despite the potential room for another route target in the previously full route-update message, the network device may maintain the other route-update message(s) intact to prevent an unintentional forwarding reconfiguration in the ISP's network.

As a specific example, a local PE router may attach route targets to first and second BGP messages in order to advertise these route targets to certain remote PE routers within an ISP's network. In this example, the first BGP message may include the maximum number of route targets capable of being advertised by a BGP message, and the second BGP message may include a single route target. In the event that the local PE router no longer needs to advertise one of the route targets attached to the first BGP message, the local PE router may remove that route target from the first BGP message such that the first BGP message no longer includes the maximum number of router targets. However, even though the first BGP message no longer includes the maximum number of route targets, the local PE router may maintain the second BGP message intact without shifting the single route target from the second BGP message to the first BGP message and/or eliminating the second BGP message.

By maintaining the second BGP message intact in this way, the local PE router may prevent the remote PE routers from misinterpreting a decreased number of BGP messages advertised by the local PE router as an indication that the local PE router is no longer operational. Moreover, by preventing the remote PE routers from misinterpreting a decreased number of BGP messages in this way, the local PE router may essentially prevent the remote PE routers from reconfiguring their forwarding tables based at least in part on such a misinterpretation.

As another example, a local PE router may attach route targets to first and second BGP messages in order to advertise these route targets to certain remote PE routers within an ISP's network. In this example, the first BGP message may include the maximum number of route targets capable of being advertised by a BGP message, and the second BGP message may include a plurality of additional route targets. In the event that the local PE router no longer needs to advertise one of the route targets attached to the first BGP message, the local PE router may remove that route target from the first BGP message such that the first BGP message no longer includes the maximum number of router targets. However, even though the first BGP message no longer includes the maximum number of route targets, the local PE router may maintain the second BGP message intact without shifting any of the additional route targets from the second BGP message to the first BGP message.

By maintaining the second BGP message intact in this way, the local PE router may prevent the remote PE routers from misinterpreting, upon reevaluating their import states, a change in the route targets attached to each BGP message as an indication that the local PE router is no longer operational. Moreover, by preventing the remote PE routers from misinterpreting a change in the route targets attached to each BGP message in this way, the local PE router may essentially prevent the remote PE routers from reconfiguring their forwarding tables based at least in part on such a misinterpretation.

The following will provide, with reference to FIG. 1, examples of apparatuses that prevent unintentional forwarding reconfiguration in network environments. The discussion corresponding to FIG. 2 will provide a detailed description of implementations that prevent unintentional forwarding reconfiguration in network environments. The discussion corresponding to FIGS. 3-9 will provide a detailed description of exemplary route-update messages used in certain implementations. The discussion corresponding to FIG. 10 will provide a detailed description of an exemplary method for preventing unintentional forwarding reconfiguration in network environments. Finally, the discussion corresponding to FIG. 11 will provide numerous examples of systems that may include the apparatus shown in FIG. 1.

FIG. 1 shows a block diagram of an exemplary apparatus 100 for preventing unintentional forwarding reconfiguration in network environments. The phrase "to forward" or "forwarding," as used herein, generally refers to any type or form of process and/or procedure that directs the flow of data traffic and/or communications within a network or across multiple networks. Forwarding reconfiguration may involve modifying the control plane and/or the forwarding plane of a network. For example, a network may include a plurality of network devices that collectively direct the flow of data traffic. In this example, the network devices may modify the control plane and/or forwarding plane of the network to change and/or redirect the flow of data traffic within the network.

The term "data traffic," as used herein, generally refers any type or form of data transfer that occurs within a network or across networks. For example, data traffic may involve transferring and/or forwarding data packets from one device to another within a network or across multiple networks. The term "control plane," as used herein, generally refers to any type or form of routing and/or switching engine that determines and/or decides how to handle the flow of data traffic within a network. In contrast, the term "forwarding plane," as used herein, generally refers to any type or form of routing and/or switching architecture that performs the handling of data traffic as directed by a control plane of a network.

As illustrated in FIG. 1, apparatus 100 may include a network device 104 communicatively coupled to a physical link 102. The term "physical link," as used herein, generally refers to any type or form of physical hardware, port, interface, and/or network segment that facilitates data traffic and/or communications for one or more computing devices within a network or across multiple networks. In one example, physical link 102 may facilitate communication for a plurality of customer networks and/or computing devices. For example, physical link 102 may represent an Ethernet segment that facilitates communication for various customers of an ISP by way of EVPNs.

The term "network device," as used herein, generally refers to any type or form of physical device, system, and/or mechanism that forwards data packets within a network and/or across multiple networks. In one example, network device 104 may reside at an edge of an ISP's network. For example, network device 104 may connect and/or interface an ISP's network with at least one customer's network. Examples of network device 104 include, without limitation, PE routers, network routers (such as ingress, egress, label edge, and/or label switch routers), Broadband Remote Access Servers (BRASes), Broadband Network Gateways (BNGs), switches, network hubs, gateways, network default gateways, nodes, servers, bridges, Field Programmable Gate Arrays (FPGAs), laptops, tablets, desktops, embedded systems, exemplary computing system 1100 in FIG. 11, portions of one or more of the same, combinations of one or more of the same, or any other suitable network device.

As illustrated in FIG. 1, network device 104 may include, generate, and/or disseminate one or more route-update messages 106(1)-(N). The term "route-update message," as used herein, generally refers to any type or form of message, communication, and/or information that indicates which route targets are currently associated with a specific physical link. In one example, route-update messages 106(1)-(N) may identify the route targets whose data traffic is routed through physical link 102. In this example, route-update messages 106(1)-(N) may each correspond to a different route and/or route prefix. Examples of route-update messages 106(1)-(N) include, without limitation, BGP messages, Open Shortest Path First (OSPF) messages, Multi-Protocol Label Switching (MPLS) messages, variations of one or more of the same, combinations of one or more of the same, or any other suitable route-update messages.

As illustrated in FIG. 1, route-update messages 106(1)-(N) may identify route targets 108(1)-(N) and 110(1)-(N), respectively. The term "route target," as used herein, generally refers to any type or form of identifier that represents and/or identifies a specific customer and/or customer network. In one example, route target 108(1) may represent and/or identify an EVPN that corresponds and/or belongs to a specific customer of an ISP. In this example, route target 108(N) may represent and/or identify another EVPN that corresponds and/or belongs to another customer of the ISP. Accordingly, the inclusion of route targets 108(1)-(N) in route-update message 106(1) may indicate that at least some of these customers' data traffic is routed through physical link 102.

Similarly, route target 110(1) may represent and/or identify an additional EVPN that corresponds and/or belongs to an additional customer of the ISP. In this example, route target 110(N) may represent and/or identify a further EVPN that corresponds and/or belongs to a further customer of the ISP. Accordingly, the inclusion of route targets 110(1)-(N) in route-update message 106(N) may indicate that at least some of these customers' data traffic is routed through physical link 102.

Figure 2:
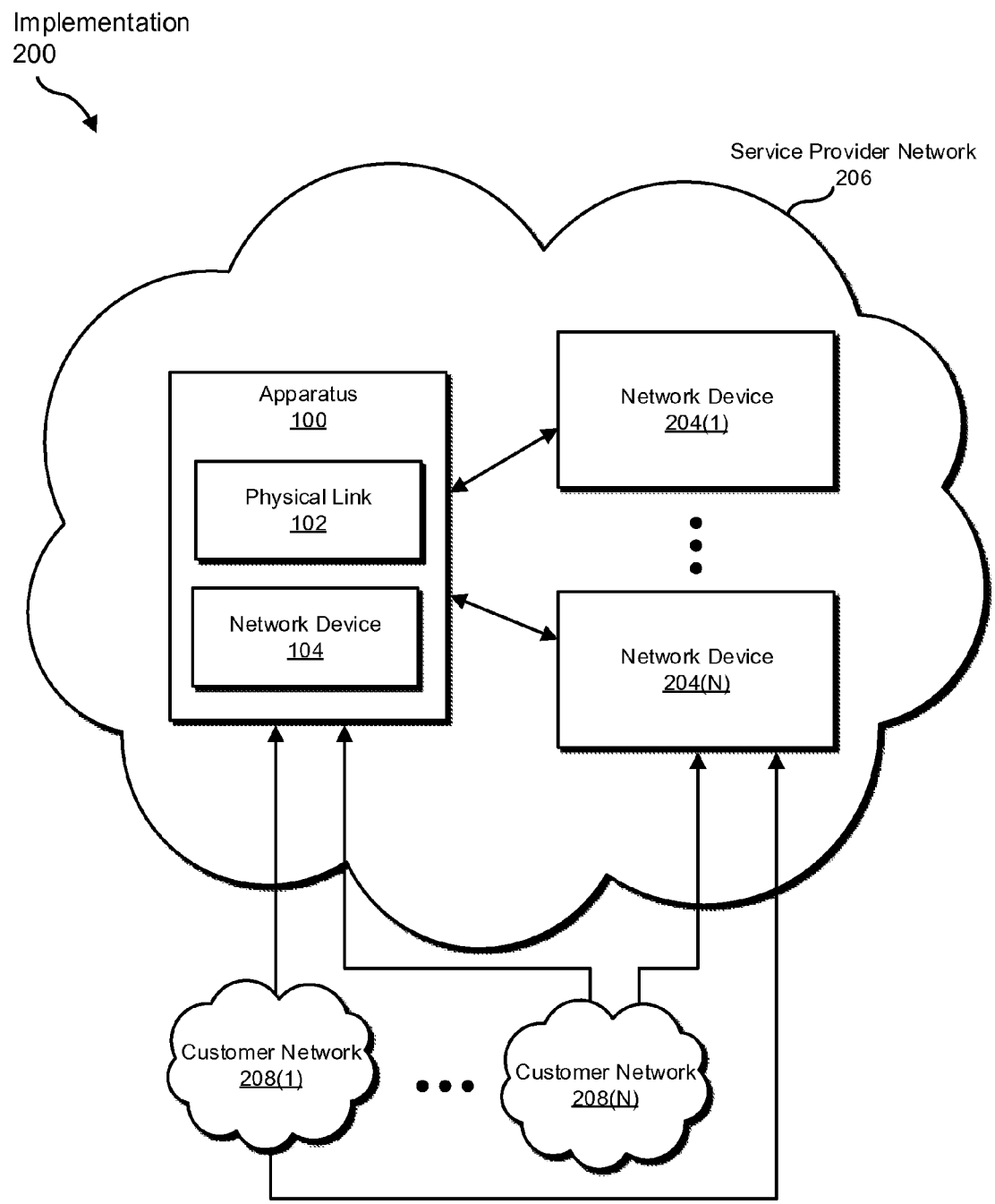
FIG. 2 is a block diagram of an exemplary implementation for preventing unintentional forwarding reconfiguration in network environments.

FIG. 2 shows a block diagram of an exemplary implementation 200 that includes apparatus 100 for preventing unintentional forwarding reconfiguration in network environments. As illustrated in FIG. 2, implementation 200 may include a plurality of customer networks 208(1)-(N) connected to a service provider network 206. The term "customer network," as used herein, generally refers to any type or form of medium and/or architecture capable of facilitating or supporting communication or data transfer. In one example, customer networks 208(1)-(N) may each correspond and/or belong to a customer, subscriber, and/or user of an ISP. Examples of customer networks 208(1)-(N) include, without limitation, EVPNs, Virtual Personal Networks (VPNs), Local Area Networks (LANs), Virtual LANs (VLANs), intranets, Wide Area Networks (WANs), Personal Area Networks (PANs), portions of one or more of the same, variations of one or more of the same, combinations of one or more of the same, or any other suitable customer networks.

The term "service provider network," as used herein, generally refers to any type or form of medium and/or architecture capable of facilitating or supporting communication or data transfer. In one example, service provider network 206 may represent a network that corresponds and/or belongs to an ISP. Examples of service provider network 206 include, without limitation, intranets, Wide Area Networks (WANs), Local Area Networks (LANs), Personal Area Networks (PANs), the Internet, ISP networks, wireline service provider networks, Power Line Communications (PLC) networks, cellular networks (e.g., Global System for Mobile Communications (GSM) networks), portions of one or more of the same, variations of one or more of the same, combinations of one or more of the same, or any other suitable service provider network.

As illustrated in FIG. 2, service provider network 206 may include apparatus 100 in communication with one or more network devices 204(1)-(N). In one example, network devices 204(1)-(N) may each reside at an edge of service provider network 206. For example, network devices 204(1)-(N) may each connect and/or interface service provider network 206 with one or more of customer networks 208(1)-(N) and/or additional customer networks (not illustrated in FIG. 2). Examples of network devices 204(1)-(N) include, without limitation, PE routers, network routers (such as ingress, egress, label edge, and/or label switch routers), Broadband Remote Access Servers (BRASes), Broadband Network Gateways (BNGs), switches, network hubs, gateways, network default gateways, nodes, servers, bridges, Field Programmable Gate Arrays (FPGAs), laptops, tablets, desktops, embedded systems, exemplary computing system 1100 in FIG. 11, portions of one or more of the same, combinations of one or more of the same, or any other suitable network device.

In some examples, network device 104 may identify route-update messages 106(1)-(N) that advertise route targets 108(1)-(N) and 110(1)-(N) in connection with physical link 102. For example, network device 104 may maintain a mapping of route targets 108(1)-(N) to route-update message 106(1) as previously advertised for the route prefix corresponding to route-update message 106(1). In this example, network device 104 may also maintain a mapping of route targets 110(1)-(N) to route-update message 106(N) as previously advertised for the route prefix corresponding to route-update message 106(N). Route targets 108(1)-(N) and 110(1)-(N) may each represent and/or correspond to one of customer networks 208(1)-(N).

In one example, route-update message 106(1) may have a configuration that includes route targets 108(1)-(N). Additionally or alternatively, route-update message 106(N) may have a configuration that includes one or more of route targets 110(1)-(N).

In one example, route targets 108(1)-(N) included in the configuration of route-update message 106(1) may represent a threshold number of route targets. This threshold may include the maximum number of route targets capable of being advertised by a single route-update message.

As a specific example, route-update messages 106(1)-(N) may each represent a BGP message that is limited to 4K of data. In the event that route targets 108(1)-(N) collectively include approximately 4K of data, network device 104 may be unable to attach all of route targets 108(1)-(N) and 110(1)-(N) to a single BGP message since route targets 108(1)-(N) and 110(1)-(N) would collectively exceed the 4K data limit. Accordingly, network device 104 may determine that route targets 108(1)-(N) and 110(1)-(N) exceed the maximum number of route targets capable of being advertised by a single route-update message. As a result, network device 104 may generate route-update messages 106(1)-(N) in connection with a specific route (e.g., an auto-discovery per Ethernet segment route) within service provider network 206. Network device 104 may then attach route targets 108(1)-(N) to route-update message 106(1) and route targets 110(1)-(N) to route-update message 106(N). Additionally or alternatively, network device 104 may advertise route targets 108(1)-(N) and route targets 110(1)-(N) in connection with physical link 102 by sending route-update messages 106(1)-(N) to network devices 204(1)-(N) via service provider network 206.

In some examples, network device 104 may remove a route target from the configuration of route-update message 106(1) due at least in part to physical link 102 no longer facilitating communication for the customer network represented by the route target. For example, after network device 104 has sent route-update messages 106(1)-(N) to network devices 204(1)-(N), a network administrator may dissociate route target 108(N) from physical link 102. Network device 104 may then determine that physical link 102 is no longer facilitating communication for customer network 208(N) based at least in part on this disassociation. In response to determining that physical link 102 is no longer facilitating communication for customer network 208(N), network device 104 may remove route target 108(N) from the configuration of route-update message 106(1). By removing route target 108(N) from the configuration of route-update message 106(1), network device 104 may free a route target slot such that the configuration of route-update message 106(1) no longer includes the threshold number of route targets.

Additionally or alternatively, in response to determining that physical link 102 is no longer facilitating communication for customer network 208(N), network device 104 may omit route target 108(N) from the configuration of route-update message 106(1) upon regenerating route-update message 106(1). By omitting route target 108(N) from the configuration of route-update message 106(1) in this way, network device 104 may free a route target slot such that the configuration of route-update message 106(1) no longer includes the threshold number of route targets.

In some examples, network device 104 may maintain the configuration of route-update message 106(N) despite the removal of route target 108(N) from route-update message 106(1). For example, network device 104 may maintain the configuration of route-update message 106(N) intact without moving any of route targets 110(1)-(N) from route-update message 106(N) to route-update message 106(1). Accordingly, network device 104 may maintain this configuration of route-update message 106(N) even though the configuration of route-update message 106(1) no longer includes the threshold number of route targets. In other words, network device 104 may maintain this configuration of route-update message 106(N) even though route-update message 106(1) has a free route target slot available.

By maintaining this configuration of route-update message 106(N), network device 104 may ensure that route-update message 106(N) is not emptied and/or eliminated by shifting any of route targets 110(1)-(N) into route-update message 106(1). Accordingly, network device 104 may avoid decreasing the number of route-update messages sent in connection with physical link 102. Moreover, by avoiding such a decrease in the number of route-update messages sent in connection with physical link 102, network device 104 may prevent network devices 204(1)-(N) from misinterpreting such a decrease as an indication that physical link 102 is no longer operational.

After the removal of route target 108(N) from route-update message 106(1), network device 104 may send route-update messages 106(1)-(N) to network devices 204(1)-(N) via service provider network 206. By sending route-update messages 106(1)-(N) to network devices 204(1)-(N) in this way, network device 104 may enable network devices 204(1)-(N) to update the forwarding plane based at least in part on physical link 102 no longer facilitating communication for customer network 208(N) represented by removed route target 108(N).

Additionally or alternatively, network device 104 may detect another route target that represents another customer network for which physical link 102 begins to facilitate communication. In the event that the configuration of route-update message 106(1) no longer includes the threshold number of route targets, network device 104 may add this other route target to the configuration of route-update message 106(1). Network device 104 may then send route-update messages 106(1)-(N) to network devices 204(1)-(N) via service provider network 206. By sending route-update messages 106(1)-(N) to network devices 204(1)-(N) in this way, network device 104 may enable network devices 204(1)-(N) to update the forwarding plane based at least in part on this other route target.

However, in the event that the configurations of route-update messages 106(1)-(N) each include the threshold number of route targets, network device 104 may generate another route-update message to include this other route target. Network device 104 may then send route-update messages 106(1)-(N) and the other route-update message to network devices 204(1)-(N) via service provider network 206. By sending these route-update messages to network devices 204(1)-(N) in this way, network device 104 may enable network devices 204(1)-(N) to update the forwarding plane based at least in part on this other route target.

FIGS. 3-6 show block diagrams of exemplary route-update messages in connection with a specific example of preventing unintentional forwarding reconfiguration in a network environment. In this specific example, a user may associate the customer networks represented by route targets 108(1)-(100) and 110(1)-(200) in FIG. 3 with physical link 102. In response to these associations, network device 104 may generate route-update messages 106(1)-(3) in FIG. 3 that include route targets 108(1)-(100) and 110(1)-(200). Network device 104 may then send route-update messages 106(1)-(3) in FIG. 3 to network devices 204(1)-(N) via service provider network 206 to facilitate updating the forwarding plane based at least in part on route targets 108(1)-(100) and 110(1)-(200).

Figure 3:
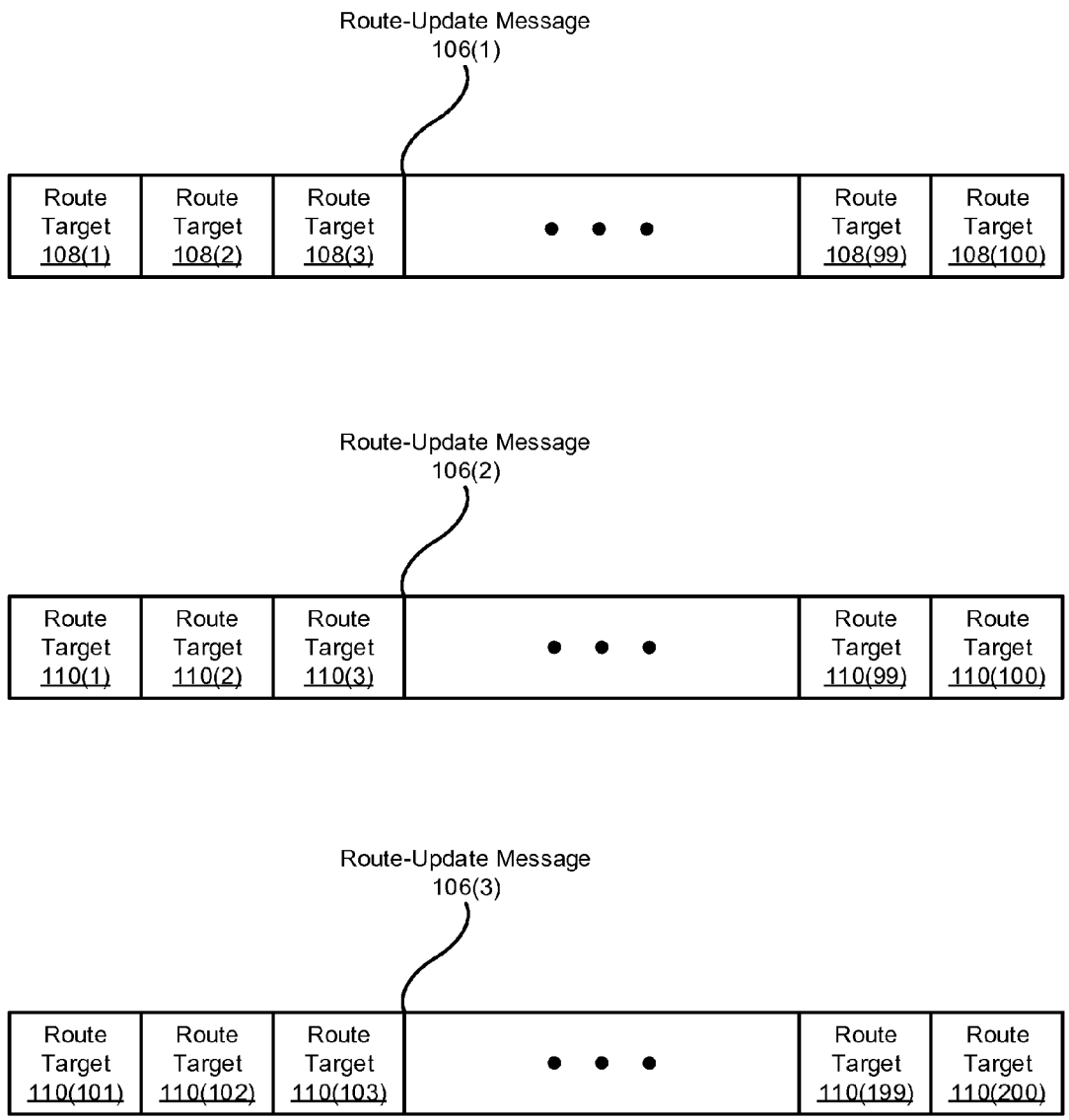
FIG. 3 is a block diagram of a plurality of exemplary route-update messages used in connection with one or more of the embodiments described and/or illustrated herein.

As illustrated in FIG. 3, route-update message 106(1) may have a configuration that includes route targets 108(1)-(100). Similarly, route-update message 106(2) may have a configuration that includes route targets 110(1)-(100). Additionally or alternatively, route-update message 106(3) may have a configuration that includes route targets 110(101)-(200). In this specific example, route-update messages 106(1)-(3) may have a data limit that prevents each from individually advertising more than 100 route targets.

Figure 4:
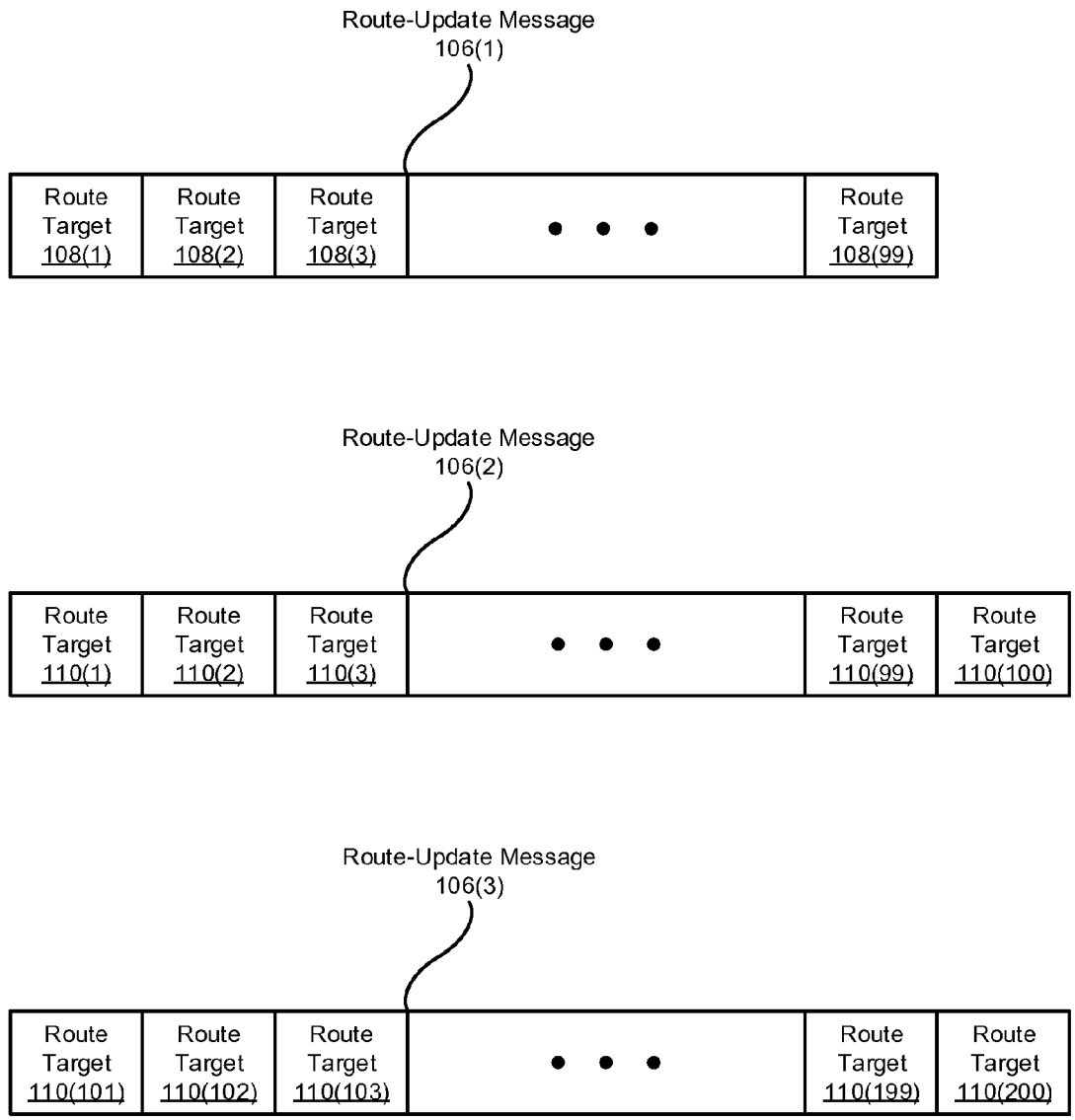
FIG. 4 is a block diagram of a plurality of exemplary route-update messages used in connection with one or more of the embodiments described and/or illustrated herein.

At some point after network device 104 has sent route-update messages 106(1)-(3) in FIG. 3 to network devices 204(1)-(N), the user may disassociate the customer network represented by route target 108(100) from physical link 102. In response to this disassociation, network device 104 may remove route target 108(100) from route-update message 106(1) in FIG. 4. As illustrated in FIG. 4, route-update message 106(1) may no longer include route target 108(100). Network device 104 may then send route-update messages 106(1)-(3) in FIG. 4 to network devices 204(1)-(N) via service provider network 206 to facilitate updating the forwarding plane based at least in part on route targets 108(1)-(99) and 110(1)-(200).

Figure 5:
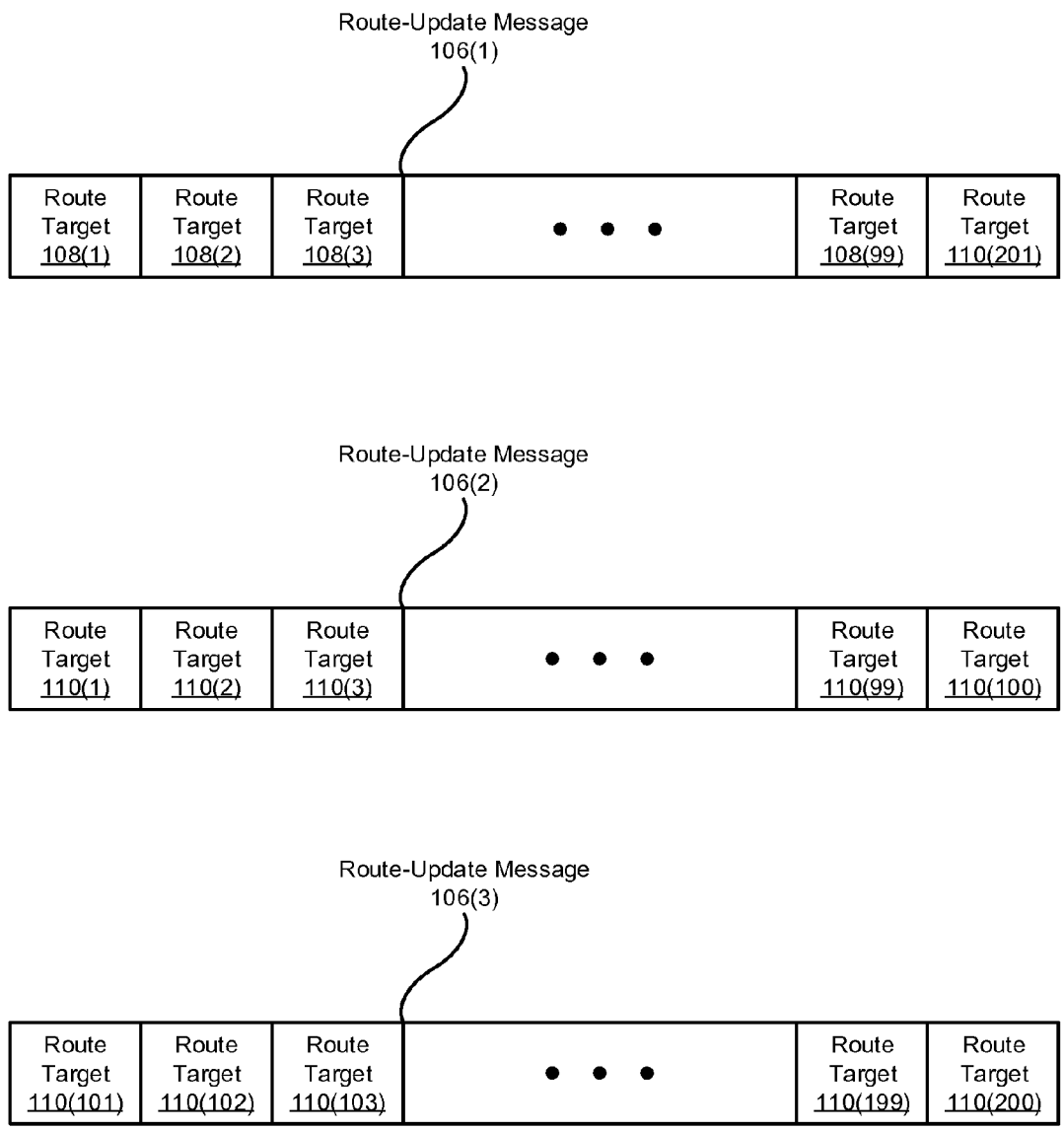
FIG. 5 is a block diagram of a plurality of exemplary route-update messages used in connection with one or more of the embodiments described and/or illustrated herein.

At some point after network device 104 has sent route-update messages 106(1)-(3) in FIG. 4 to network devices 204(1)-(N), the user may associate the customer network represented by route target 110(201) in FIG. 5 with physical link 102. In response to this association, network device 104 may add route target 110(201) to route-update message 106(1) in FIG. 5. As illustrated in FIG. 5, route-update message 106(1) may now include route target 110(201). Network device 104 may then send route-update messages 106(1)-(3) in FIG. 5 to network devices 204(1)-(N) via service provider network 206 to facilitate updating the forwarding plane based at least in part on route targets 108(1)-(99) and 110(1)-(201).

Figure 6:
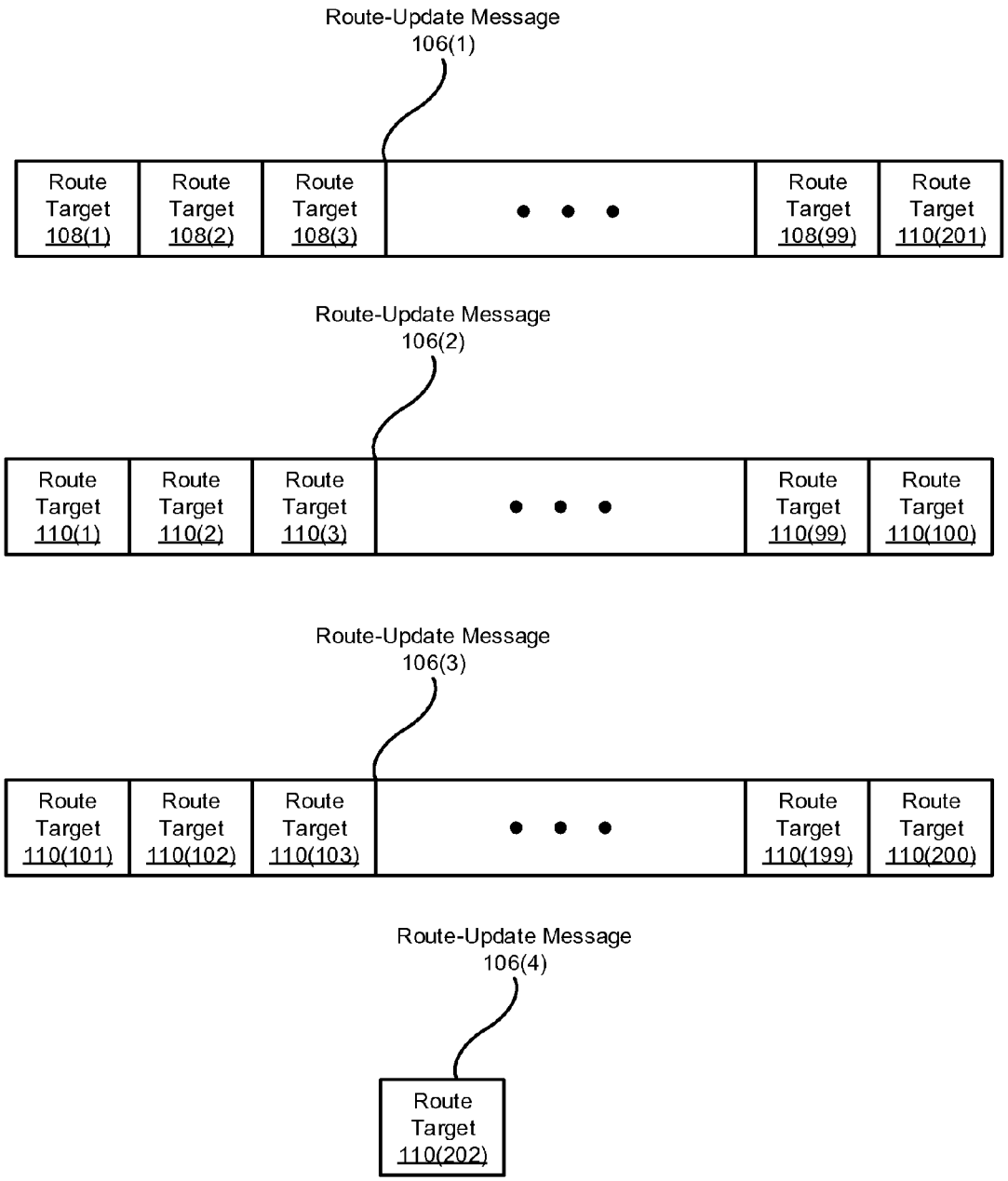
FIG. 6 is a block diagram of a plurality of exemplary route-update messages used in connection with one or more of the embodiments described and/or illustrated herein.

At some point after network device 104 has sent route-update messages 106(1)-(3) in FIG. 5 to network devices 204(1)-(N), the user may associate the customer network represented by route target 110(202) in FIG. 6 with physical link 102. In response to this association, network device 104 may generate route-update message 106(4) in FIG. 5 and then attach route target 110(202). As illustrated in FIG. 6, route-update message 106(4) may include only route target 110(202). Network device 104 may then send route-update messages 106(1)-(4) in FIG. 6 to network devices 204(1)-(N) via service provider network 206 to facilitate updating the forwarding plane based at least in part on route targets 108(1)-(99) and 110(1)-(202).

Figure 7:
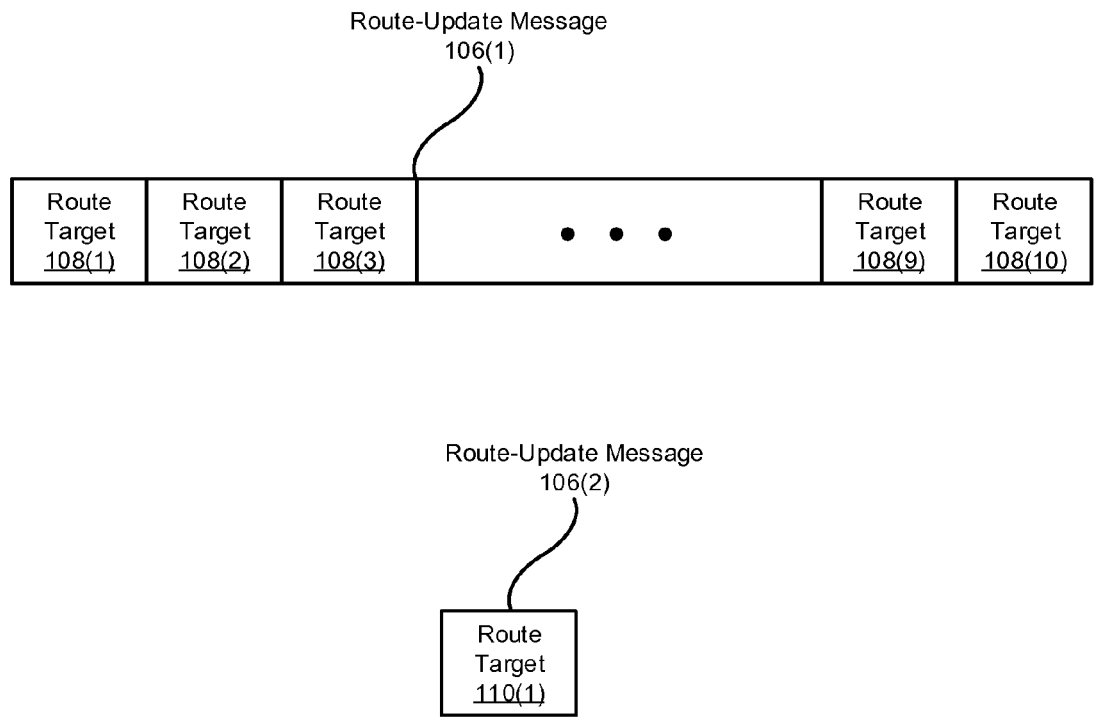
FIG. 7 is a block diagram of a plurality of exemplary route-update messages used in connection with one or more of the embodiments described and/or illustrated herein.
Figure 8:
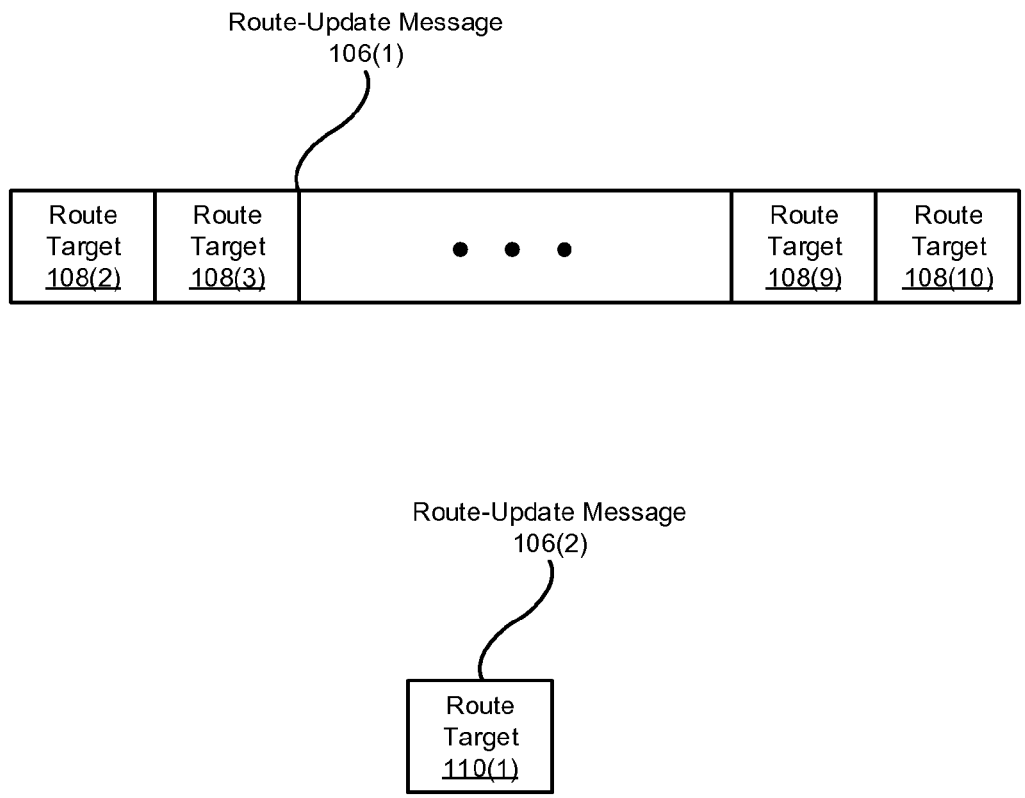
FIG. 8 is a block diagram of a plurality of exemplary route-update messages used in connection with one or more of the embodiments described and/or illustrated herein.
Figure 9:
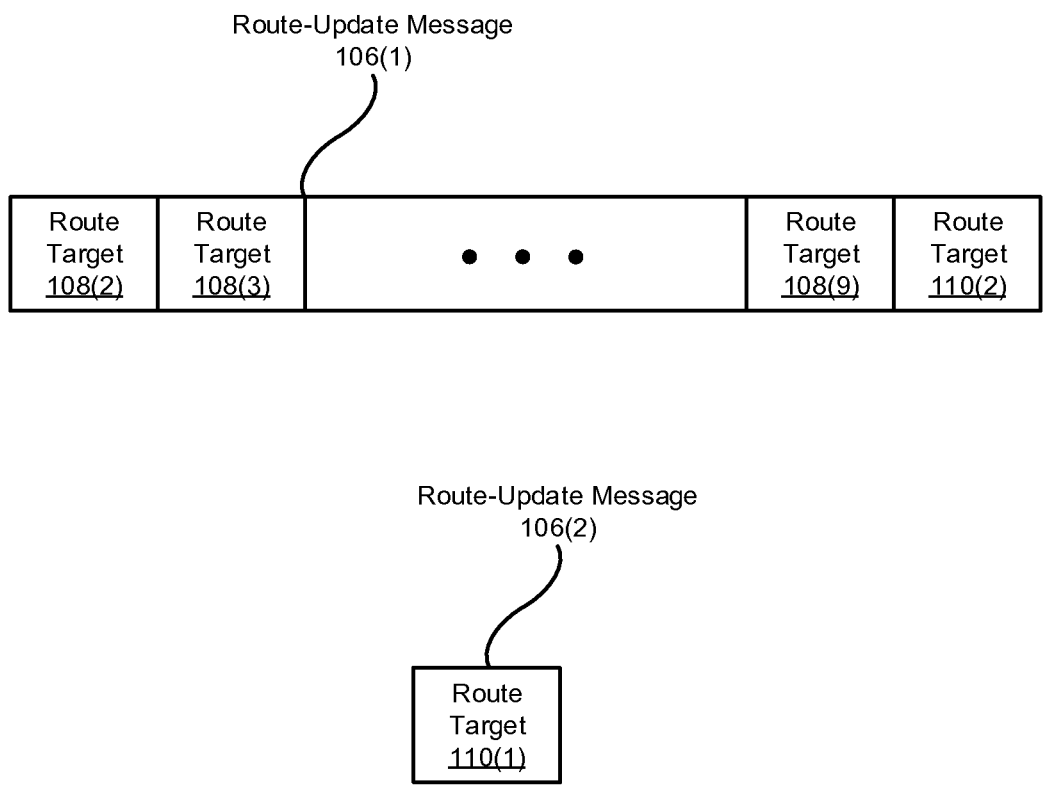
FIG. 9 is a block diagram of a plurality of exemplary route-update messages used in connection with one or more of the embodiments described and/or illustrated herein.

FIGS. 7-9 show block diagrams of exemplary route-update messages in connection with another specific example of preventing unintentional forwarding reconfiguration in a network environment. In this specific example, a user may associate the customer networks represented by route targets 108(1)-(10) and 110(1) in FIG. 7 with physical link 102. In response to these associations, network device 104 may generate route-update messages 106(1)-(2) in FIG. 7 that include route targets 108(1)-(10) and 110(1). Network device 104 may then send route-update messages 106(1)-(2) in FIG. 7 to network devices 204(1)-(N) via service provider network 206 to facilitate updating the forwarding plane based at least in part on route targets 108(1)-(10) and 110(1).

As illustrated in FIG. 7, route-update message 106(1) may have a configuration that includes route targets 108(1)-(10). Similarly, route-update message 106(2) may have a configuration that includes only route target 110(1). In this specific example, route-update messages 106(1)-(2) may have a data limit that prevents each from individually advertising more than 10 route targets.

At some point after network device 104 has sent route-update messages 106(1)-(2) in FIG. 7 to network devices 204(1)-(N), the user may disassociate the customer network represented by route target 108(1) from physical link 102. In response to this disassociation, network device 104 may remove route target 108(1) from route-update message 106(1) in FIG. 8. As illustrated in FIG. 8, route-update message 106(1) may no longer include route target 108(1). Network device 104 may then send route-update messages 106(1)-(2) in FIG. 8 to network devices 204(1)-(N) via service provider network 206 to facilitate updating the forwarding plane based at least in part on route targets 108(2)-(10) and 110(1).

At some point after network device 104 has sent route-update messages 106(1)-(2) in FIG. 8 to network devices 204(1)-(N), the user may associate the customer network represented by route target 110(2) in FIG. 9 with physical link 102. In response to this association, network device 104 may add route target 110(2) to route-update message 106(1) in FIG. 9. As illustrated in FIG. 9, route-update message 106(1) may now include route target 110(2). Network device 104 may then send route-update messages 106(1)-(2) in FIG. 9 to network devices 204(1)-(N) via service provider network 206 to facilitate updating the forwarding plane based at least in part on route targets 108(2)-(10) and 110(1)-(2).

Figure 10:
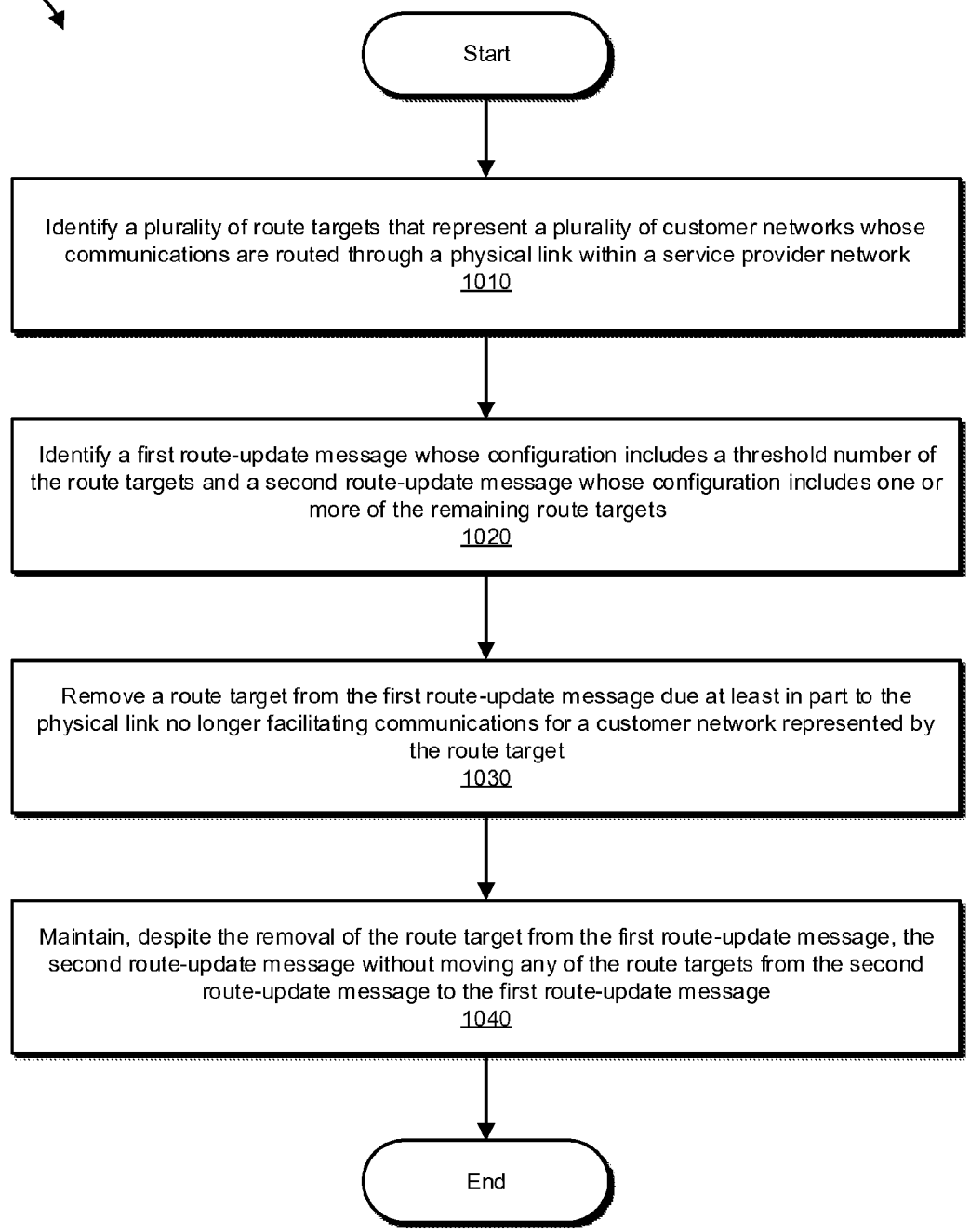
FIG. 10 is a flow diagram of an exemplary method for preventing unintentional forwarding reconfiguration in network environments.

FIG. 10 is a flow diagram of an exemplary method 1000 for preventing unintentional forwarding configuration in network environments. Method 1000 may include the step of identifying a plurality of route targets that represent a plurality of customer networks whose communications are routed through a physical link within a service provider network (1010). This identifying step may be performed in a variety of ways. For example, network device 104 may, as part of apparatus 100, maintain a mapping of route targets 108(1)-(N) to route-update message 106(1) as previously advertised for the route prefix corresponding to route-update message 106(1). Network device 104 may also maintain a mapping of route targets 110(1)-(N) to route-update message 106(N) as previously advertised for the route prefix corresponding to route-update message 106(N). Network device 104 may identify route-targets 108(1)-(N) and 110(1)-(N) based at least in part on these mappings.

Returning to FIG. 10, method 1000 may also include the step of identifying a plurality of route-update messages that advertise the plurality of route targets to at least one network device within the service provider network (1020). This identifying step may be performed in a variety of ways. For example, network device 104 may, as part of apparatus 100, identify a record of route-update messages 106(1)-(N) that were previously sent to network devices 204(1)-(N) in connection with physical link 102. Additionally or alternatively, network device 104 may determine route-update messages 106(1)-(N) based at least in part on the mappings of route targets 108(1)-(N) and 110(1)-(N) to route-update messages 106(1)-(N).

This plurality of route-update messages may include a first route-update message whose configuration includes a threshold number of route targets from the plurality of route targets and a second route-update message whose configuration includes one or more of the remaining route targets from the plurality of plurality of route targets. For example, route-update message 106(1) may have a configuration that includes a threshold number of route targets 108(1)-(N). In this example, route-update message 106(N) may have a configuration that includes one or more of route targets 110(1)-(N).

Returning to FIG. 10, method 1000 may additionally include the step of removing a route target from the first route-update message due at least in part to the physical link no longer facilitating communications for a customer network represented by the route target (1030). This removal step may be performed in a variety of ways. For example, physical link 102 may no longer be facilitating communications for customer network 208(N). In this example, network device 104 may, as part of apparatus 100, remove route target 108(N) from route-update message 106(1) due at least in part to physical link 102 no longer facilitating communications for customer network 208(N). Additionally or alternatively, network device 104 may omit route target 108(N) from the configuration of route-update message 106(1) upon regenerating route-update message 106(1) based at least in part on the corresponding mapping.

Returning to FIG. 10, method 1000 may further include the step of maintaining the configuration of second route-update message without moving any of the route targets from the second route-update message to the first route-update message despite the removal of the route target from the first route-update message (1040). This maintaining step may be performed in a variety of ways. For example, network device 104 may, as part of apparatus 100, maintain the configuration of route-update message 106(N) despite the removal of route target 108(N) from route-update message 106(1). Accordingly, network device 104 may refuse to move any of route targets 110(1)-(N) from route-update message 106(N) to the route-update message 106(1) in response to the removal of route target 108(N) from the configuration of route-update message 106(1). Additionally or alternatively, network device 104 may regenerate route-update message 106(N) such that the configuration of route-update message 106(N) includes all of route targets 110(1)-(N).

As explained above in connection with FIGS. 1-10, an EVPN application installed on a PE router may maintain a mapping of route targets advertised for an Auto-Discovery per Ethernet Segment (AD-per-ES) route. The EVPN application may pack route targets into the AD-per-ES route until reaching the maximum BGP update message size. The EVPN application may also construct additional AD-per-ES routes to hold additional route targets on an as-needed basis.

The EVPN application may direct the PE router to periodically advertise the route targets in connection with the AD-per-ES routes by way of BGP update messages. These AD-per-ES routes may each have and/or correspond to a different route prefix. As a result, even though these routes may have the same key (e.g., the same Ethernet segment and/or Ethernet tag identifier), the remote PE routers that import the BGP update messages may treat the corresponding AD-per-ES routes independent of one another, thereby potentially preventing unintentional forwarding reconfiguration.

Figure 11:
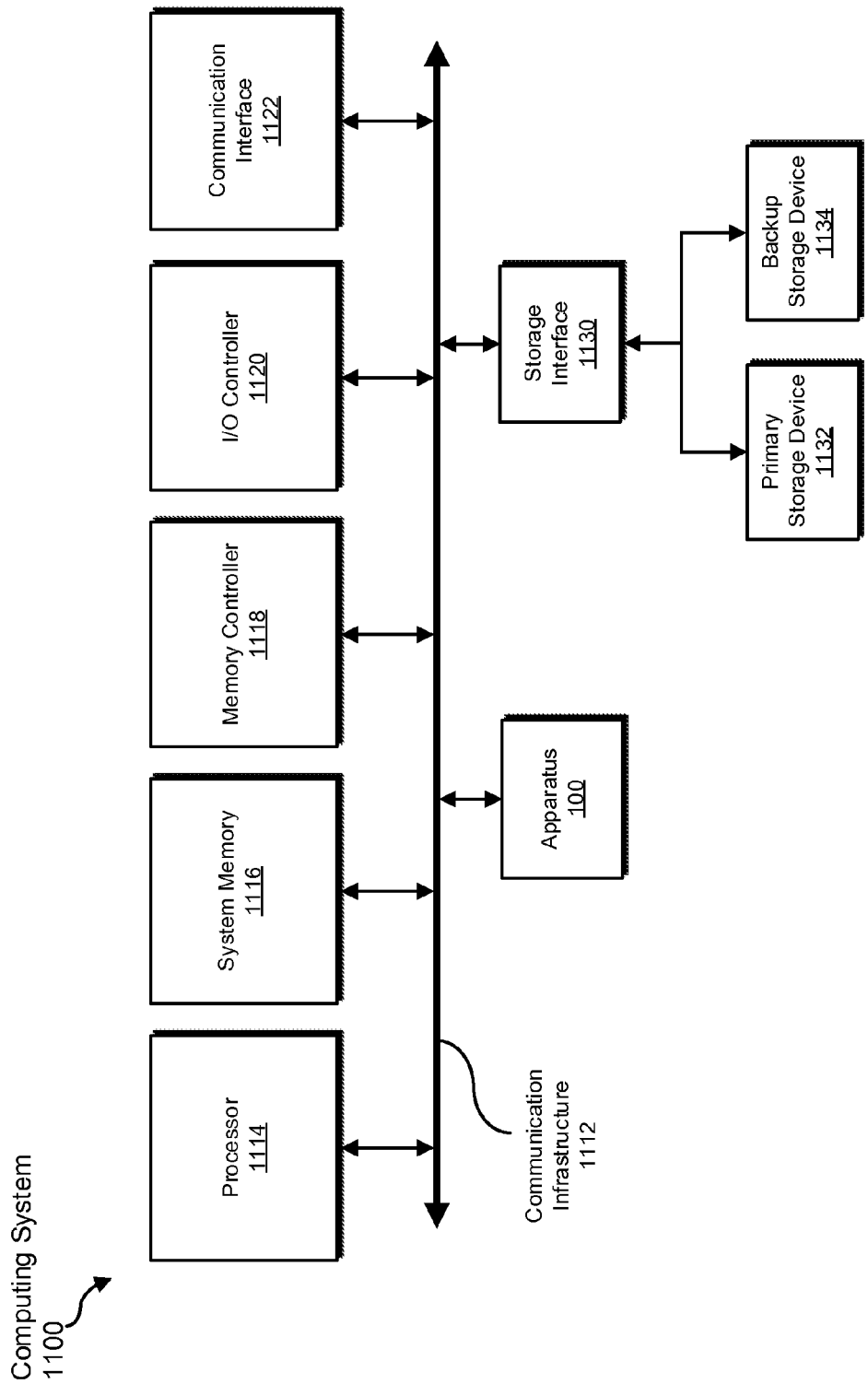
FIG. 11 is a block diagram of an exemplary computing system capable of implementing and/or being used in connection with one or more of the embodiments described and/or illustrated herein.

FIG. 11 is a block diagram of an exemplary computing system 1100 capable of implementing and/or being used in connection with one or more of the embodiments described and/or illustrated herein. In some embodiments, all or a portion of computing system 1100 may perform and/or be a means for performing, either alone or in combination with other elements, one or more of the steps described in connection with FIG. 10. All or a portion of computing system 1100 may also perform and/or be a means for performing and/or implementing any other steps, methods, or processes described and/or illustrated herein. In one example, computing system 1100 may include apparatus 100 from FIG. 1.

Computing system 1100 broadly represents any type or form of electrical load, including a single or multi-processor computing device or system capable of executing computer-readable instructions. Examples of computing system 1100 include, without limitation, workstations, laptops, client-side terminals, servers, distributed computing systems, mobile devices, network switches, network routers (e.g., PE routers, backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1100 may be programmed, configured, and/or otherwise designed to comply with one or more networking protocols. According to certain embodiments, computing system 1100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1100 may include various network and/or computing components. For example, computing system 1100 may include at least one processor 1114 and a system memory 1116. Processor 1114 generally represents any type or form of processing unit capable of processing data or interpreting and executing instructions. For example, processor 1114 may represent an application-specific integrated circuit (ASIC), a system on a chip (e.g., a network processor), a hardware accelerator, a general purpose processor, and/or any other suitable processing element.

Processor 1114 may process data according to one or more of the networking protocols discussed above. For example, processor 1114 may execute or implement a portion of a protocol stack, may process packets, may perform memory operations (e.g., queuing packets for later processing), may execute end-user applications, and/or may perform any other processing tasks.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1100 may include both a volatile memory unit (such as, for example, system memory 1116) and a non-volatile storage device (such as, for example, primary storage device 1132, as described in detail below). System memory 1116 may be implemented as shared memory and/or distributed memory in a network device. Furthermore, system memory 1116 may store packets and/or other information used in networking operations.

In certain embodiments, exemplary computing system 1100 may also include one or more components or elements in addition to processor 1114 and system memory 1116. For example, as illustrated in FIG. 11, computing system 1100 may include a memory controller 1118, an Input/Output (I/O) controller 1120, and a communication interface 1122, each of which may be interconnected via communication infrastructure 1112. Communication infrastructure 1112 generally represents any type or form of infrastructure capable of facilitating communication between one or more components of a computing device. Examples of communication infrastructure 1112 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1118 generally represents any type or form of device capable of handling memory or data or controlling communication between one or more components of computing system 1100. For example, in certain embodiments memory controller 1118 may control communication between processor 1114, system memory 1116, and I/O controller 1120 via communication infrastructure 1112. In some embodiments, memory controller 1118 may include a Direct Memory Access (DMA) unit that may transfer data (e.g., packets) to or from a link adapter.

I/O controller 1120 generally represents any type or form of device or module capable of coordinating and/or controlling the input and output functions of a computing device. For example, in certain embodiments I/O controller 1120 may control or facilitate transfer of data between one or more elements of computing system 1100, such as processor 1114, system memory 1116, communication interface 1122, and storage interface 1130.

Communication interface 1122 broadly represents any type or form of communication device or adapter capable of facilitating communication between exemplary computing system 1100 and one or more additional devices. For example, in certain embodiments communication interface 1122 may facilitate communication between computing system 1100 and a private or public network including additional computing systems. Examples of communication interface 1122 include, without limitation, a link adapter, a wired network interface (such as a network interface card), a wireless network interface (such as a wireless network interface card), and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1122 may also represent a host adapter configured to facilitate communication between computing system 1100 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also enable computing system 1100 to engage in distributed or remote computing. For example, communication interface 1122 may receive instructions from a remote device or send instructions to a remote device for execution.

As illustrated in FIG. 11, exemplary computing system 1100 may also include a primary storage device 1132 and/or a backup storage device 1134 coupled to communication infrastructure 1112 via a storage interface 1130. Storage devices 1132 and 1134 generally represent any type or form of storage device or medium capable of storing data and/or other computer-readable instructions. For example, storage devices 1132 and 1134 may represent a magnetic disk drive (e.g., a so-called hard drive), a solid state drive, a floppy disk drive, a magnetic tape drive, an optical disk drive, a flash drive, or the like. Storage interface 1130 generally represents any type or form of interface or device for transferring data between storage devices 1132 and 1134 and other components of computing system 1100.

In certain embodiments, storage devices 1132 and 1134 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1134 may also include other similar structures or devices for allowing computer software, data, or other computer-readable instructions to be loaded into computing system 1100. For example, storage devices 1132 and 1134 may be configured to read and write software, data, or other computer-readable information. Storage devices 1132 and 1134 may be a part of computing system 1100 or may be separate devices accessed through other interface systems.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from those shown in FIG. 11. Computing system 1100 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a physical link that facilitates communication for a plurality of customer networks connected to a service provider network; and
   a network device communicatively coupled to the physical link, wherein the network device:
      identifies a plurality of route-update messages that advertise a plurality of route targets representing the plurality of customer networks to at least one other network device within the service provider network, the plurality of route-update messages comprising:
         a first route-update message whose configuration includes a threshold number of route targets from the plurality of route targets;
         a second route-update message whose configuration includes one or more other route targets from the plurality of route targets;
      removes a route target from the configuration of the first route-update message due at least in part to the physical link no longer facilitating communication for a customer network represented by the route target; and
      maintains, despite the removal of the route target from the configuration of the first route-update message, the configuration of the second route-update message without moving any of the route targets from the second route-update message to the first route-update message.

2. The apparatus of claim 1, wherein:
   the plurality of customer networks each comprise an Ethernet Virtual Private Network (EVPN) that corresponds to a customer of a service provider; and
   the plurality of route-update messages each comprise a Border Gateway Protocol (BGP) message.

3. The apparatus of claim 1, wherein the network device generates the plurality of route-update messages to advertise the plurality of route targets in connection with a specific route within the service provider network.

4. The apparatus of claim 3, wherein:
   the threshold number of route targets comprises a maximum number of route targets capable of being advertised by a single route-update message; and
   the network device:
      determines that the plurality of route targets representing the plurality of customer networks exceeds the maximum number of route targets capable of being advertised by a single route-update message; and
      attaches a subset of the plurality of route targets to the first route-update message and another subset of the plurality of route targets to the second route-update message due at least in part to the plurality of route targets exceeding the maximum number of route targets capable of being advertised by a single route-update message.

5. The apparatus of claim 3, wherein the specific route within the service provider network comprises an auto-discovery per Ethernet segment route within the service provider network.

6. The apparatus of claim 1, wherein the network device:
   determines that the physical link no longer facilitates communication for the customer network represented by the route target; and
   removes the route target from the configuration of the first route-update message in response to determining that the physical link no longer facilitates communication for the customer network represented by the route target.

7. The apparatus of claim 1, wherein the network device sends the plurality of route-update messages to the other network device via the service provider network to enable the other network device to update a forwarding plane based at least in part on the physical link no longer facilitating communication for the customer network represented by the removed route target.

8. The apparatus of claim 1, wherein:
   the configuration of the first route-update message includes the threshold number of route targets from the plurality of route targets;
   the configuration of the second route-update message includes a single route target from the plurality of route targets; and
   the network device:
      removes the route target from the configuration of the first route-update message such that the configuration of the first route-update message no longer includes the threshold number of route targets; and
      maintains, even though the configuration of the first route-update message no longer includes the threshold number of route targets, the configuration of the second route-update message instead of moving the single route target from the second route-update message to the first route-update message and eliminating the second route-update message.

9. The apparatus of claim 8, wherein the network device:
   detects, after the removal of the route target from the configuration of the first route-update message, another route target that represents another customer network for which the physical link begins to facilitate communication; and
   adds the other route target to the configuration of the first route-update message due at least in part to the configuration of the first route-update message no longer including the threshold number of route targets.

10. The apparatus of claim 1, wherein the network device:
    detects another route target that represents another customer network for which the physical link begins to facilitate communication;
    determines that the configurations of the first and second route-update messages each include the threshold number of route targets;
    generates a third route-update message to include the other route target representing the other customer network for which the physical link begins to facilitate communication in response to determining that the configurations of the first and second route-update messages each include the threshold number of route targets; and
    sends the third route-update message to the other network device via the service provider network to enable the other network device to update a forwarding plane based at least in part on the physical link beginning to facilitate communication for the other customer network.

11. A system comprising:
a physical link that facilitates communication for a plurality of EVPNs connected to a service provider network; and
a network device communicatively coupled to the physical link, wherein the network device:
identifies a plurality of BGP messages that advertise a plurality of route targets representing the plurality of EVPNs to at least one other network device within the service provider network, the plurality of BGP messages comprising:
a first BGP message whose configuration includes a threshold number of route targets from the plurality of route targets;
a second BGP message whose configuration includes one or more other route targets from the plurality of route targets;
removes a route target from the configuration of the first BGP message due at least in part to the physical link no longer facilitating communication for a customer network represented by the route target; and
maintains, despite the removal of the route target from the configuration of the first BGP message, the configuration of the second BGP message without moving any of the route targets from the second BGP message to the first BGP message.

12. The system of claim 11, wherein the network device generates the plurality of BGP messages to advertise the plurality of route targets in connection with a specific route within the service provider network.

13. The system of claim 12, wherein:
the threshold number of route targets comprises a maximum number of route targets capable of being advertised by a single route-update message; and
the network device:
determines that the plurality of route targets representing the plurality of EVPNs exceeds the maximum number of route targets capable of being advertised by a single BGP message; and
attaches a subset of the plurality of route targets to the first BGP message and another subset of the plurality of route targets to the second BGP message due at least in part to the plurality of route targets exceeding the maximum number of route targets capable of being advertised by a single BGP message.

14. The system of claim 12, wherein the specific route within the service provider network comprises an auto-discovery per Ethernet segment route within the service provider network.

15. The system of claim 11, wherein the network device:
determines that the physical link no longer facilitates communication for the customer network represented by the route target; and
removes the route target from the configuration of the first BGP message in response to determining that the physical link no longer facilitates communication for the customer network represented by the route target.

16. The system of claim 11, wherein the network device sends the plurality of BGP messages to the other network device via the service provider network to enable the other network device to update a forwarding plane based at least in part on the physical link no longer facilitating communication for the customer network represented by the removed route target.

17. The system of claim 11, wherein:
the configuration of the first BGP message includes the threshold number of route targets from the plurality of route targets;
the configuration of the second BGP message includes a single route target from the plurality of route targets; and
the network device:
removes the route target from the configuration of the first BGP message such that the configuration of the first BGP message no longer includes the threshold number of route targets; and
maintains, even though the configuration of the first BGP message no longer includes the threshold number of route targets, the configuration of the second BGP message instead of moving the single route target from the second BGP message to the first BGP message and eliminating the second BGP message.

18. The system of claim 17, wherein the network device:
detects, after the removal of the route target from the configuration of the first BGP message, another route target representing another customer network for which the physical link begins to facilitate communication; and
adds the other route target to the configuration of the first BGP message due at least in part to the configuration of the first BGP message no longer including the threshold number of route targets.

19. The system of claim 11, wherein the network device:
detects another route target representing another customer network for which the physical link begins to facilitate communication;
determines that the configurations of the first and second BGP messages each include the threshold number of route targets;
generates a third BGP message whose configuration includes the other route target for which the physical link begins to facilitate communication in response to determining that the configurations of the first and second BGP messages each include the threshold number of route targets; and
sends the third BGP message to the other network device via the network to enable the other network device to update a forwarding plane based at least in part on the physical link beginning to facilitate communication for the other customer network represented by the other route target.

20. A method comprising:
identifying a plurality of route targets that represent a plurality of customer networks whose communications are routed through a physical link within a service provider network;
identifying a plurality of route-update messages that advertise the plurality of route targets to at least one network device within the service provider network, the plurality of route-update messages comprising:
a first route-update message whose configuration includes a threshold number of route targets from the plurality of route targets;
a second route-update message whose configuration includes at least one route target from the plurality of route targets;
removing a route target from the configuration of the first route-update message due at least in part to the physical link no longer facilitating communications for a customer network represented by the route target; and maintaining, despite the removal of the route target from the configuration of the first route-update message, the configuration of the second route-update message without moving any of the route targets from the second route-update message to the first route-update message.

* * * * *